US006570606B1

(12) United States Patent
Sidhu et al.

(10) Patent No.: US 6,570,606 B1
(45) Date of Patent: May 27, 2003

(54) METHOD AND APPARATUS FOR CONTROLLING TRANSMISSION OF MEDIA SIGNALS OVER A DATA NETWORK IN RESPONSE TO TRIGGERING EVENTS AT PARTICIPATING STATIONS

(75) Inventors: Ikhlaq Sidhu, Buffalo Grove, IL (US); Guido M. Schuster, Des Plaines, IL (US); Jerry Mahler, Prospect Heights, IL (US); Thomas Kostas, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/087,155

(22) Filed: May 29, 1998

(51) Int. Cl.$^7$ .......................... H04N 7/14; H04N 5/445; G06E 15/16
(52) U.S. Cl. ..................... 348/14.1; 709/204; 725/60
(58) Field of Search ............................ 348/13, 14, 15, 348/17, 18, 19, 2, 1, 12, 14.09, 14.1; 345/330; 725/22, 60, 61, 86, 87, 107, 117; 370/276, 447, 321; 709/204; 379/90.01

(56) References Cited

U.S. PATENT DOCUMENTS

| | | | | |
|---|---|---|---|---|
| 4,625,308 A | * | 11/1986 | Kim et al. | 370/321 |
| 4,750,165 A | * | 6/1988 | Champagne et al. | 370/276 |
| 5,091,780 A | * | 2/1992 | Pomerleau | 358/108 |
| 5,347,306 A | * | 9/1994 | Nitta | 348/15 |
| 5,548,346 A | * | 8/1996 | Mimura et al. | 348/738 |
| 5,638,114 A | * | 6/1997 | Hatanaka et al. | 348/15 |
| 5,686,957 A | * | 11/1997 | Baker | 348/36 |
| 5,745,380 A | * | 4/1998 | Sandvoss et al. | 379/90.01 |
| 5,767,913 A | * | 6/1998 | Kassatly | 348/403 |
| 5,926,226 A | | 7/1999 | Proctor et al. | |
| 5,959,622 A | * | 9/1999 | Greer et al. | 345/330 |
| 5,959,662 A | * | 9/1999 | Shaffer et al. | 348/15 |

OTHER PUBLICATIONS

Microsoft "NetMeeting—Software Developers Kit" web page (Jan. 5, 1998).
Microsoft NetMeeting "Video Channel" web page (Nov. 1, 1997).
Microsoft NetMeeting "Conference Manager Object" web page (Nov. 1, 1997).
Microsoft NetMeeting "Channel Object" web page (Nov. 1, 1997).

* cited by examiner

Primary Examiner—Gims S. Philippe
(74) Attorney, Agent, or Firm—McDonnell Boehnen Hulbert & Berghoff (57) ABSTRACT

A method and apparatus for controlling the transmission of real-time media signals over a data network based on a triggering event associated with a participating teleconference station. This triggering event may be the presence or absence of motion, the presence or absence of sound, or any of a variety of other events that preferably indicate the presence or absence of a person at the station. When no person is present at the station and/or when an appropriate triggering event occurs, remote teleconference participants will not transmit media signals over the network to the station, thereby conserving valuable network bandwidth and simulating a physically common meeting between people. In turn, when a person is present at the station and/or when another appropriate triggering event occurs, remote teleconference participants may start transmitting media signals over the network to the station. Additionally, a station may control its own transmission of media signals to remote stations in response to local triggering events, thus further conserving network resources.

25 Claims, 3 Drawing Sheets

METHOD AND APPARATUS FOR CONTROLLING TRANSMISSION OF MEDIA SIGNALS OVER A DATA NETWORK IN RESPONSE TO TRIGGERING EVENTS AT PARTICIPATING STATIONS

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The present invention relates to the transmission of real-time media signals over a data network and more particularly to a method and apparatus for controlling transmission of real-time media signals in a network-based teleconference.

2. Description of the Related Art

Long before the advent of personal computers and high speed data links, people have often found it necessary and efficient to meet with each other in person. In-person meetings facilitate face-to-face interaction and mutual exchanges. Further, such meetings are generally convenient to set up and execute, especially where the participants are located in the same geographic area. With the growth of the world market and the decentralization of businesses, however, in-person meetings are becoming less common. Workers are often geographically dispersed and therefore unable to meet with each other in person without traveling long distances.

A principle goal of modern teleconferencing systems is therefore to simulate in-person meetings. Teleconferencing systems do so by transmitting real-time audio and video signals over high speed data networks. Conference participants who would otherwise have been together in a physically common meeting place may then conveniently position themselves at multimedia teleconferencing stations that communicate over a network. Typically, each conferencing station includes a video camera and a microphone and a video display and sound speakers. Each participant may thus see and hear the others as though they were in a physically common location together.

Traditionally, network-based teleconferencing has been connection-oriented in nature. In a connection-oriented design, the conference participants must set up the conference call by having one conferencing station call another conferencing station. For instance, when a new person wishes to be added to a teleconference, typically the person must set up a station as a conference participant to communicate with the others over the data network. Unfortunately, however, by requiring active work by the participants when they wish to view and converse with each other, this system is unlike a meeting at a physically common location.

In order to make the teleconference more like a physically common meeting, a method of establishing seamless teleconferences is to leave the teleconference connection set up at all times between a pair of remote network locations. In this mode of operation, the transmitting end will continuously send audio and video over the network even when there is no one at the receiving end. Unfortunately, however, this solution is very inefficient and expensive, as it requires constant use of network resources and related infrastructure.

In view of the deficiencies in the existing art, a need therefore exists for an improved method of providing network-based teleconferencing.

SUMMARY OF THE INVENTION

The present invention provides a method and apparatus for controlling the transmission of real-time media signals over a data network based on a triggering event associated with a participating teleconference station. This triggering event may be the presence or absence of motion, the presence or absence of sound, or any of a variety of other events that preferably indicate the presence or absence of a person at the station. When no person is present at the station and/or when an appropriate triggering event occurs, remote teleconference participants will not transmit media signals over the network to the station, thereby conserving valuable network bandwidth. In turn, when a person is present at the station and/or when another appropriate triggering event occurs, remote teleconference participants may start transmitting media signals over the network to the station. Additionally, a station may control its own transmission of media signals to remote stations in response to local triggering events, thus further conserving network resources.

By controlling transmission over a network based on appropriate triggering events at participating teleconference stations, the present invention can beneficially simulate a physically common meeting between people, allowing a person to seamlessly join a teleconference by arriving at a participating station. Provided with the present invention, before a person arrives at the station, the station can be "virtually connected" to a teleconference, similar to an empty chair awaiting a person in a conference room. Once a person arrives at the participating station (as determined by a motion detector, for instance), the station may begin to receive and transmit media signals over the network, similar to a person entering a conference room, sitting in an empty chair, and beginning to interact with other participants.

It is therefore an object of the present invention to provide a method and apparatus for multimedia teleconferencing. It is further an object of the present invention to provide a method and apparatus for conserving network resources and processing power. Still further, it is an object of the present invention to provide a method and apparatus for simulating a physically common meeting between people.

Additionally, it is an object of the present invention to provide a method and apparatus for controlling transmission of media signals between teleconference participants in response to triggering events occurring at participating stations. Further, it is an object of the present invention to provide a method and apparatus for controlling transmission of media signals between teleconference participants in response to the presence or absence of a person at a participating station. Still further, it is an object of the present invention to control transmission of media signals over a network in response to the presence or absence of motion or sound at a participating station. Yet further, it is an object of the present invention to stop transmission to a participating teleconference station in response to an absence of motion at the station.

These and other objects and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF THE PREFERRED AND ALTERNATIVE EMBODIMENTS

Figure 1:
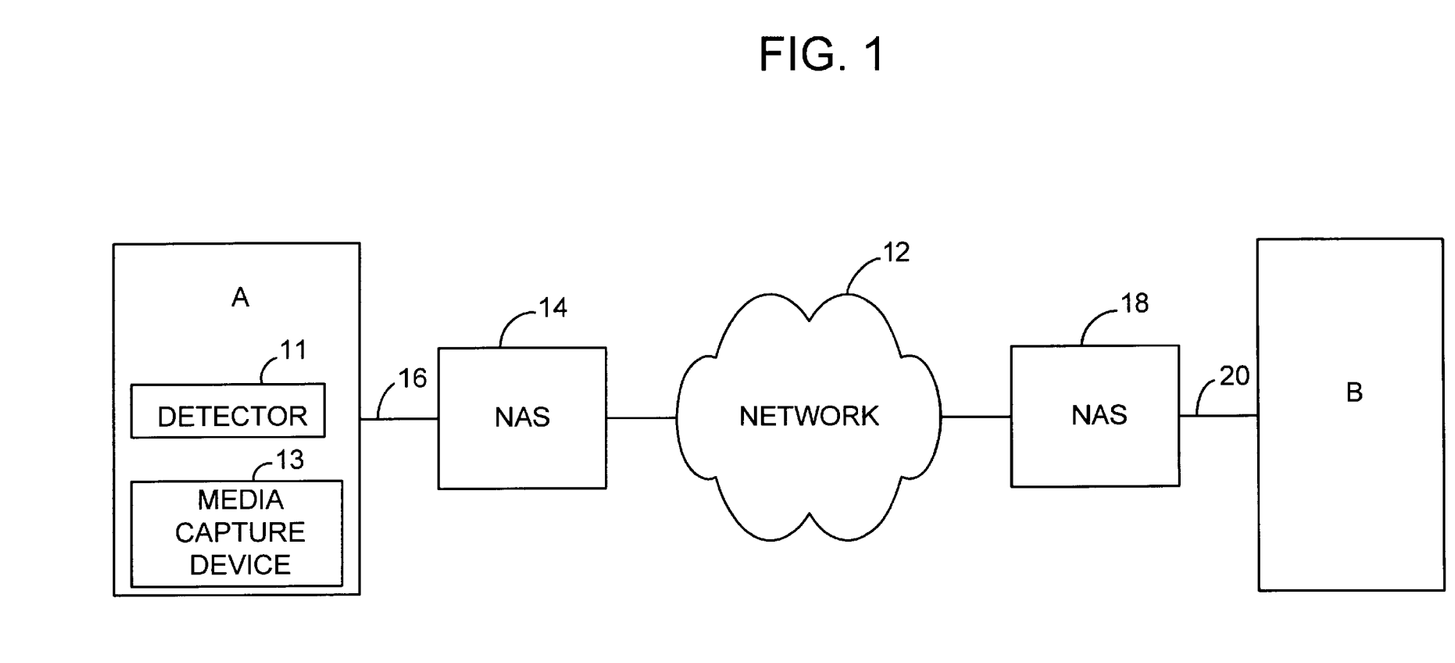
FIG. 1 is a block diagram illustrating the components of a two-party network-based teleconference in which a preferred embodiment of the present invention may be employed.

The present invention may be usefully implemented in a communication system in which two or more stations are set to engage in a multi-media teleconference over a network. Referring to the drawings, FIG. 1 shows one such system by way of example. As illustrated by FIG. 1, two stations, A and B, are set to engage in a teleconference over a network 12.

In general, the term "teleconference" as used in this description encompasses the transmission of a substantially real-time media signal such as digitized audio and/or video between at least two participating stations. The term may extend to multidirectional and/or unidirectional transmission between the stations. Without limitation, an example of multidirectional transmission may occur when the image and sound of a person respectively at each station is transmitted to, and played at, the other station(s). Without limitation, an example of unidirectional transmission may occur when a camera at one station transmits the image and sound of a person to a remote monitoring station.

The network 12 over which the participating stations will engage in a teleconference may be any data network now known or later developed. In the preferred embodiment, however, network 12 is a packet-switched wide area network or a combination of large computer networks joined together over high-speed data links. An example of one such computer network is the world wide "Internet", which is well known to those skilled in the art and therefore will not be described. However, the network may be another other wide area, metropolitan area or local area network, or a combination of such networks, and may extend to include any wired and/or wireless data links.

Additionally, the protocol or protocols according to which the participating stations encode and transmit media signals over the network for the teleconference is not critical. As those skilled in the art are aware, numerous multi-media encoding standards exist. Examples of video coding standards include Recommendations H.261, H.262 and H.263 as promulgated by the International Telecommunications Union (ITU), and examples of audio coding standards include, for instance, ITU Recommendations G.711, G.728, G.722, G.723.1 and G.729. Further, numerous packet transmission protocols exist, including, for instance, the well-known TCP/IP model. The present invention may be usefully employed in connection with media signals encoded and transmitted according to any of these or other suitable protocols.

To facilitate a teleconference over network 12, each participating station is preferably configured to capture local media signals such as audio and video and to encode and transmit those signals over the network. Additionally, each station is preferably adapted to receive encoded media signals from the network and to decode and play those signals for listening and viewing by a person at the station.

While the particular configuration of each station is not critical, a preferred station may include a multi-media personal computer having an advanced processor (such as Intel Pentium II or faster), a memory, a keyboard, a video monitor, a set of sound speakers, and video and sound processing logic. In order to capture local media signals, the preferred station further includes media capture devices such as, but not limited to, a video camera and a microphone. For convenience, these media capture devices, 13 may be positioned at the computer or at any other suitable location but are, in any event, considered to be part of the preferred conferencing station, and the media that they capture are considered to be media at or associated with the conferencing station.

A preferred station additionally operates a teleconferencing program, which serves to encode outgoing media signals and to decode incoming media signals. Without limitation, an example of a suitable teleconferencing program for use in this context is the Microsoft NetMeeting software, available from Microsoft Corporation. Microsoft NetMeeting is well known to those skilled in the art and therefore will not be described.

By convention, but without limitation, each conferencing station is typically interconnected to a network access server at the edge of network 12 via a data link. As shown in FIG. 1, for instance, station A is interconnected to network access server 14 via data link 16, and station B is interconnected to network access server 18 via data link 20. The data link may take any of a variety of forms. For example, the data link may be a conventional telephone circuit, such as that provided by the public switched telephone network (PSTN). As another example, the data link may be a LAN or other network interconnected via a transmission line to the network access server. Still more generally, the data link may be any wired or wireless communications path including, for example, copper wire, fiber optic, T1, ISDN, cellular, microwave or satellite links.

The network access server provides connectivity between the conferencing station and the network 12. For this purpose, the network access server preferably includes a line interface circuit that operates to connect the network access server to the respective data link and a network interface circuit that operates to connect the network access server to network 12. Additionally, the network access server preferably includes one or more modems and/or computer processors, together with memory, interconnected via a bus with the line interface and configured to process data that flows between the respective data link and network 12.

An example of a suitable network access server is described in U.S. Pat. No. 5,528,595 (Walsh et al.), which is entitled "Modem Input/Output Signal Processing Techniques," and which issued on Jun. 18, 1996 to U.S. Robotics, Inc. Such a device has been commercialized widely by 3Com Corporation (previously U.S. Robotics Corp.) under the designation Total Control™ Enterprise Network Hub. Network access servers similar in functionality, architecture and design are also available from other companies, including Ascend Communications, Livingston Enterprises, Multitech, and others.

Figure 2:
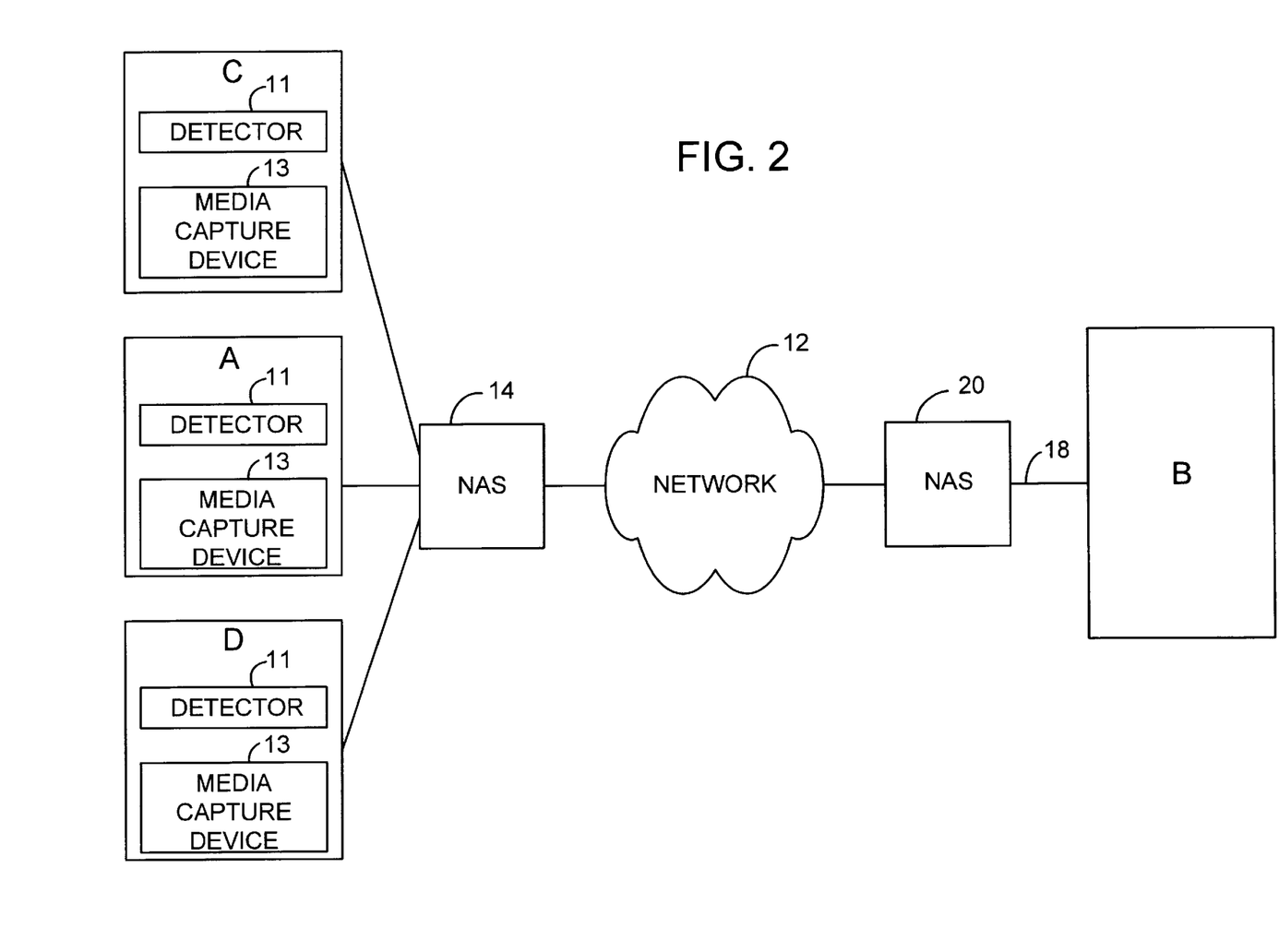
FIG. 2 is a block diagram illustrating the components of a multi-party network-based teleconference in which a preferred embodiment of the present invention may be employed.

Although FIG. 1 depicts each network access server as interconnected to a single conferencing station, those skilled in the art will appreciate that a network access server may function to interconnect multiple stations to a network. In a network-based teleconference, the network access server may then broadcast or "multi-cast" incoming media signals to a specified station or group of stations. For this purpose, the network access server may maintain a table in memory indicating which of its "clients" (stations) is registered to receive media signals, as identified, for instance, by a unique port number or source address carried by the incoming signals. Referring to FIG. 2, for example, network access server 16 may interconnect stations A, C and D to network 12 and may be set to distribute to stations A and C any media signals arriving over the network from station B. Network access server 20 may in turn perform a similar function for it client or clients at the remote end.

The present invention provides a useful method and apparatus for controlling the transmission of media signals in a teleconference over a network, based on a triggering event at a participating station. Any suitable triggering event may be used. Examples of appropriate triggering events include, but are not limited to, the presence or absence of motion, the presence or absence of sound, the presence or absence of speech, and/or the presence or absence of a person.

In the preferred embodiment, however, the triggering is the presence or absence of motion or sound at the station. In this regard, reference to the "absence" of motion or sound may be interpreted, without limitation, as the absolute absence of all motion or sound or as the absence of motion or sound more than some predetermined level (as, for instance, when only a nominal level of motion or sound is present). Similarly, reference to the "presence" of motion or sound may be interpreted, without limitation, as the presence of any motion or sound whatsoever or as the presence of any motion or sound more than some predetermined level (as for instance when a person moves at least a predetermined distance at the station).

For simplicity, this specification will describe the use of motion (or its absence) as the applicable triggering event. However, the invention may be extended to employ other suitable triggering events in addition to or instead of motion.

To detect the presence or absence of motion at (or otherwise associated with) a participating station, a station according to the preferred embodiment is equipped with a motion detector. The motion detector may take any of a variety of forms, including, but not limited to, a discrete hardware device designed to detect motion or a computer processor that operates a set of machine language instructions designed to detect motion in a captured video image.

A station operating according to the preferred embodiment may have a motion-state in which motion exists at the station (e.g., in a local video image) and a still-state in which absence of motion exists at the station (e.g., in the local video image). In the preferred embodiment, the motion detector outputs, or facilitates derivation of, a motion-status signal that indicates whether the station is in the motion-state or the still-state. When motion is present (or when status changes from absence of motion to presence of motion), the status signal may be referred to as a MOTION signal (having a MOTION state). In contrast, when motion is absent (or when status changes from presence of motion to absence of motion), the status signal may be referred to as a STILL signal (having a STILL state).

As a simple example, the motion detector may be an infrared sensor of the type manufactured by Leviton Manufacturing Company or others. Typically used to control room lights, such sensors provide a signal in response to motion. This signal may be attenuated and then conveniently fed through a parallel or serial port into a computer at the station. The station may then process or respond to the presence or absence of motion as indicated by this signal.

In a more robust embodiment, a processor at the station may perform motion detection by analyzing video signals provided by the local video capture device. For instance, as those skilled in the art are aware, many video encoding standards (such as MPEG 1 and 2, and H.263, for instance) call for encoding video signals with "motion estimation." Generally speaking, this process works by receiving and comparing sequential frames of the video image (as represented by the video signal) signal and then generating motion vectors that represent the change or movement in an image from one frame to the next. In practice, after transmitting a full frame (referred to as an "intraframe") over the network, the encoding station may then simply transmit the lower bandwidth motion vector and estimation error information (referred to as a "predicted" frame or "interframe") to allow the remote end to reproduce the next frame.

Conveniently, a station operating in accordance with the present invention may use this motion vector information to determine whether motion exists at the station. To do so, the station may calculate the energy associated with motion vectors belonging to one or more interframes. For example, the station may sum the squares of the components of each motion vector associated with a given frame. If the total energy is more than a predetermined threshold, then the station may determine that motion exists in the video image. In contrast, if the total energy is less than a predetermined threshold, then the station may determine that an absence of motion exists in the video image.

According to the preferred embodiment, a participating station ("transmitting station") in a network-based teleconference will transmit video signals over the network to another station ("receiving station") only when motion is present at the receiving station. Absent motion at the receiving station, the preferred embodiment may reasonably assume that no person is present at the receiving station to watch an incoming video image. Therefore, presumably no reason exists to use network bandwidth for transmission of video signals to the receiving station. In contrast, when the receiving station detects motion, the preferred embodiment may reasonably assume that a person is present at the receiving station to watch an incoming video image. Therefore, good reason then exists to transmit video signals over the network to the receiving station.

In order to control transmission of media signals over the network in response to the presence or absence of motion, the receiving station preferably sends a transmission-control message over the network to the transmitting station in response to the motion-status signal. The transmitting station will then either start or stop transmission of media signals to the receiving station in response to the transmission-control message.

The transmission-control message should specify whether the remote (transmitting) station should start or stop transmitting media signals over the network to the local (receiving) station. In the preferred embodiment, a transmission-control message is sent in response to a change in motion-status. When a local station begins to detect motion, the station should send a control message over the network telling the remote station to begin transmitting video signals to the local station. This control message may be a START-TRANSMIT message. When a local station begins to detect the absence of motion (preferably waiting a for predetermined time period to ensure the absence of motion), the station should send a control message over the network telling the remote station to stop transmitting video signals to the local station. This control message may be a STOP-TRANSMIT message.

In turn, when the remote station receives a START-TRANSMIT message from the local station, the remote station should begin to transmit video signals over the network to the local station. Similarly, when the remote station receives a STOP-TRANSMIT message from the local station, the remote station should stop transmitting video signals over the network to the local station.

In this regard, the extent to which a station "stops" transmission of video signals upon receipt of a STOP-TRANSMIT message may depend on design criteria but should to some degree serve to reduce the burden on the network. For instance, the station may respond to a STOP-TRANSMIT message by entirely ceasing transmission of video signals to the receiving station. Alternatively, the station may respond to a STOP-TRANSMIT message by reducing its video transmission to a nominal level. As an example of nominal video transmission, the station may stop continuous transmission of video signals and instead transmit one or more still images (such as a periodic transmission of still images). As another example of nominal transmission, the station may compress its video signals more than necessary during the encoding process, which may distort the underlying video image but should advantageously require less bandwidth for transmission over the network.

In general, where two stations are set to engage in network-based teleconference with each other, each station may maintain and operate according to a set of state variables. These state variables may include a "default-transmit" variable, a "default-receive" variable, a "motion-status" variable, and a "transmit-status" variable. The default-transmit variable may specify the network address of the station to which media signals are to be transmitted. The default-receive variable may specify the network address of the transmitting station from which media signals are to be received. The motion-status variable may be a binary variable that specifies if motion is present locally. The transmit-status variable may be a binary variable that specifies whether media is being transmitted from the station.

Figure 3:
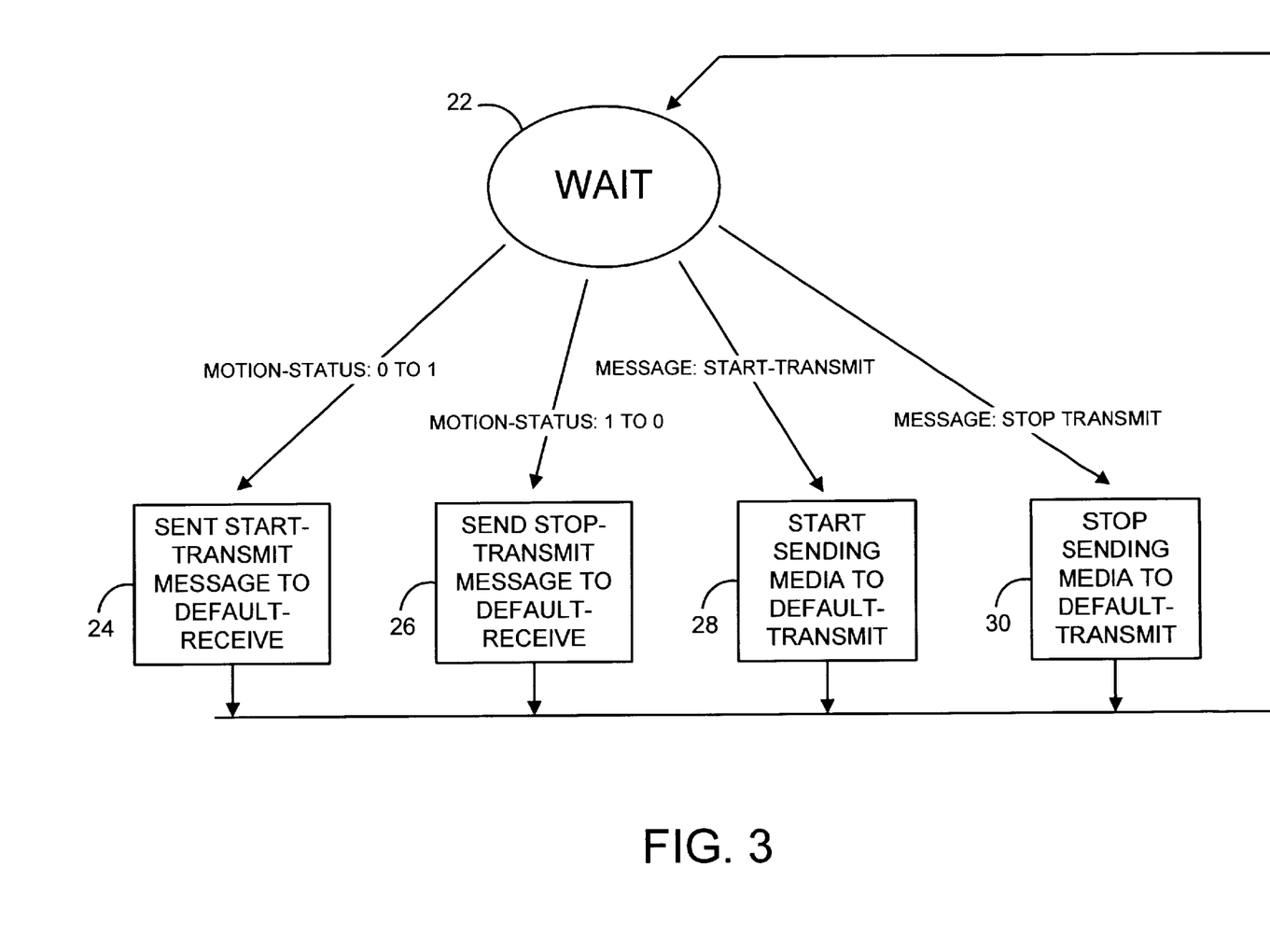
FIG. 3 is a state diagram of a teleconference station operating in accordance with a preferred embodiment of the present invention.

Applying these state variables, FIG. 3 illustrates a state diagram of a teleconference station operating according to the preferred embodiment of the invention. Referring to FIG. 3, at stage 22, the station waits for a change in state. When the motion-status variable changes from 0 to 1 (indicating the start of motion), as shown at stage 24, the station sends a START-TRANSMIT message to the network address specified by the default-receive variable. When the motion-status variable changes from 1 to 0 (indicating that motion has stopped), as shown at stage 26, the station sends a STOP-TRANSMIT message to the network address specified by the default-receive variable. In turn, when the station receives a START-TRANSMIT message, as shown at stage 28, the station begins transmitting video to the network address specified by the default-transmit variable. Finally, when the station receives a STOP-TRANSMIT message, as shown at stage 30, the station stops sending video.

The control functions of the present invention can be conveniently written in software code and executed by a processor at each station. To illustrate, the following is a set of pseudo-code for carrying out aspects of the invention in a two-station teleconference. This pseudo-code is written for a message-driven operating system such as Microsoft Windows.

'(c) Copyright 1998 3Com Corporation

```
initialization (done only once, when application starts up).
counter = 0
remote_transmit = 0
request one second timer messages be sent to application
message "seconds counter" arrives from operating system
motion_sense = get_motion_status()
if(motion_sense == 1)
counter = 0
if(remote_transmit == 0)
remote_transmit = 1
send "start transmit" message to peer
if( (motion_sense == 0) &&
(counter == 0) &&
(remote_transmit == 1) )
counter = TIMEOUT_DELAY
if(counter > 0)
counter --
if(counter == 0)
remote_transmit = 0
send "stop transmit" message to peer
message "start transmit" arrives from network
send "unpause" message to netmeeting
message "stop transmit" arrives from network
send "pause" message to netmeeting.
```

In the first block of this pseudo-code, the variables counter and remote_transmit are initialized. The counter variable will serve to test whether motion has been absent for long enough to justify transmitting a STOP-TRANSMIT message to the remote end. The remote_transmit variable is a binary variable indicating whether or not the remote end is currently transmitting. Additionally in this block, the code requests the operating system to provide a counter signal every second, which will be used to periodically test the motion-status. The SetTimer function of Microsoft Visual C++ can provide this seconds-counter function.

The next block of this pseudo-code runs every second, as triggered by the seconds-counter. In this block, the code tests the motion-status signal provided by the motion detector. The get_motion_status( ) function may conveniently use the "inp" command provided by Microsoft Visual C++ to sense the hardware input from a line on the parallel port interface to the station. The code then stores the result of this function call in the binary variable motion_sense. If motion_sense is 1, indicating the presence of motion at the station, then the code sets the counter variable to 0 (as there is no need to wait). In contrast, if remote_transmit is 0, indicating that the remote end is not currently transmitting media signals to the station, then the code sets remote_transmit to 1 and sends a START-TRANSMIT message to the remote end.

On the other hand, if motion_sense is 0 and remote_transmit is 1, indicating that motion is absent at the station but the remote end is currently transmitting media over the network to the station, then, provided that counter is 0 (indicating that the timer is not already counting down), the code sets counter to a predetermined value TIMEOUT_DELAY. As a result, the counter will start counting down from TIMEOUT_DELAY to 0, thereby waiting enough time to ensure that motion is truly absent from the station before telling the remote end to stop transmitting. In particular, the code will decrement the counter at each time interval until the counter reaches zero. Once the counter reaches zero, the code will set remote_transmit to 0 and will send a STOP-TRANSMIT message to the remote end.

In the final blocks of the pseudo-code, the station (as a transmitting station) responds to incoming START-TRANSMIT and STOP-TRANSMIT messages from the network. If the station receives a START-TRANSMIT message from the network, the station instructs NetMeeting to "unpause" the video conference, to start transmitting media signals to the remote station. In contrast, if the station receives a STOP-TRANSMIT message from the network, the station instructs NetMeeting to "pause" the video conference, to stop transmitting media signals to the remote station. In this regard, the NetMeeting Software Developers Kit (which is available from Microsoft Corporation) provides an "INmChannelVideo" object during a video conference, and the code may instruct NetMeeting to pause or unpause the conference by use of the SetProperty member function of that object.

The foregoing examples describe the operation of the invention where the stations themselves provide the transmission-control signals in accordance with the present invention. According to a preferred embodiment of the invention, however, a participating station may instead send its motion-status signal (or a related signal) to its network access server, and its network access server may responsively send appropriate transmission-control messages to the network access server(s) associated with other participating stations. This preferred mode of operation will work particularly well when one or more of the network access servers multi-casts to several participating stations as described above.

In general, having the network access servers manage transmission control based on motion status at their respective stations will provide a robust solution regardless of the number of participating stations. In general, once a network access server learns of an absence of motion at one of its associated stations, the network access server may stop distributing incoming media signals to that station but may continue distributing incoming media signals to other participating stations, if any, that it serves. Once the network access server learns of an absence of motion at all of its associated stations, the network access server may then send a STOP-TRANSMIT message to the transmitting station. In turn, once the network access server learns of a presence of motion at one or more of its associated stations, the network access server may send a START-TRANSMIT message to the transmitting station or associated network access server.

An example will help to illustrate. Referring to FIG. 2 for this example, assume that people at stations A and C are currently engaging in a teleconference over network 12 with a person at station B. In this scenario, network access server 16 may maintain a registration table in memory indicating that stations A and C (but not station D) are involved in a teleconference with station B and are therefore to receive media signals carrying the source address "B" (or, for instance, carrying a unique port number associated with the teleconference).

Assume next that the person at station C leaves. As a result, the motion detector at station C will detect an absence of motion (for instance, after a predetermined time, to ensure that the person is indeed gone). Station C will then preferably send a STILL status signal (or related signal) to network access server 16. Upon receipt of this STILL status signal, network access server 16 will recognize that station C does not need to receive media signals from station B, so network access server 16 will remove station C from the group listed in its registration table for the teleconference with station B. When media signals then arrive over the network from station B, network access server 16 will forward the media signals to the only one of its stations currently set to receive transmissions of such signals, station A. At the same time, however, the teleconferencing program operated by station C will remain ready to receive incoming media signals should such signals begin to arrive.

Assume next that the person at station A leaves as well. As a result, the motion detector at station A will detect an absence of motion, and station A will preferably send a STILL status signal (or related signal) to network access server 16. Upon receipt of this STILL status signal, network access server 16 will then recognize that none of its stations (A, C and D) need to receive media signals from station B. Consequently, to conserve network bandwidth, network access server 16 will send a STOP-TRANSMIT message over the network to network access server 20 and/or to station B. In response, network access server 20 and/or station B will stop transmitting media signals over the network to the stations served by network access server 16.

In turn, assume next that a person arrives at station A. When the person arrives, the motion detector at station A will detect the presence of motion, and station A will responsively send a MOTION status signal to network access server 16. Upon receipt of this MOTION status signal, network access server will again register station A as a member of the teleconference group. In addition, in order to start transmission of media signals over the network from station B to station A, network access server 16 will transmit a START-TRANSMIT message to network access server 20 and/or station B. In response, network access server 20 and/or station B will begin transmitting media signals over the network to network access server 16, and network access server 16 will distribute the incoming media signals to participating station A.

The above discussion has focussed primarily on a receiving station detecting the presence or absence of motion and on advising a transmitting station to start or stop transmission of media signals over the network in response to motion-status. Depending on design requirements, the invention may also extend, however, to having a local station itself start and stop transmission of video signals based on the presence or absence of motion at that local station. In particular, when the station detects the presence of motion, it may begin transmitting video signals, and when the station detects the absence of motion, it may stop transmitting video signals. By avoiding unnecessary transmission of video signals when no motion is present at the transmitting end, the invention can still further conserve network resources and better simulate a physically common meeting of people.

As a general matter, a transmitting station in a teleconference can control its own transmission of media signals in response to its own motion-status signal. In response to a MOTION signal, for instance, the station would start transmitting video signals over the network to the other participating stations. In contrast, in response to a STILL signal, the station would stop transmitting video signals to the other stations.

As an alternative embodiment, a station can control its own transmission of media signals during the teleconference by switching on and off power to its video capture device in response to its motion-status signal and continuing to transmit whatever video signal is provided by the video capture device. If the video capture device is turned on, it will provide a real-time video signal to the video card at the station, and the station will encode and transmit the video to the other participating station(s). In contrast, if the video capture device is turned off, it will provide a blank or still image to the video card, and the station will encode and transmit the blank or still image. Conveniently, if the station is encoding the video signal with motion compensation, this still video image may be represented almost exclusively by interframes, which will greatly reduce the network bandwidth used for transmission when motion is absent.

As indicated above, the foregoing description has focused on the use of motion detection to control the transmission of media signals in a network-based teleconference. As further suggested above, however, the invention may equally extend to the use of other types of triggering mechanisms, such as the presence or absence of audio, the presence or absence of speech, or other incidental events. More generally, the triggering event may be simply the presence or absence of a person at the station, which may be detected in any number of ways including, but not limited to, employing a switch to sense when a person is sitting in a chair at the station.

Preferred embodiments of the present invention have been described above. Those skilled in the art will understand, however, that changes and modifications may be made in these embodiments without departing from the true scope and spirit of the present invention, which is defined by the following claims.

We claim:

1. A method of controlling transmission of media signals over a data network between a local station and a remote station, the method comprising:

sending a START-TRANSMIT message over the data network to the remote station in response to detection of the presence of motion at the local station, whereby, the remote station starts transmission of video signals over the data network to the local station in response to the START-TRANSMIT message.

2. A method of controlling transmission of media signals over a data network between a local station and a remote station, the method comprising:

sending a START-TRANSMIT message over the data network to the remote station in response to detection of the presence of sound at the local station, whereby, the remote station starts transmission of video signals over the data network to the local station in response to the START-TRANSMIT message.

3. A method of controlling transmission of media signals over a data network between a local station and a remote station, the method comprising:

sending a START-TRANSMIT message over the data network to the remote station in response to detection of the presence of a person at the local station, whereby, the remote station starts transmission of video signals over the data network to the local station in response to the START-TRANSMIT message.

4. A method of controlling transmission of video signals over a data network between a local station and a remote station, the method comprising:

sending a STOP-TRANSMIT message over the data network to the remote station in response to detection of the absence of motion at the local station, whereby, the remote station stops transmission of video signals over the data network to the local station in response to the STOP-TRANSMIT message.

5. A method of controlling transmission of video signals over a data network between a local station and a remote station, the method comprising:

sending a STOP-TRANSMIT message over the data network to the remote station in response to detection of the absence of sound at the local station, whereby, the remote station stops transmission of video signals over the data network to the local station in response to the STOP-TRANSMIT message.

6. A method of controlling transmission of video signals over a data network between a local station and a remote station, the method comprising:

sending a STOP-TRANSMIT message over the data network to the remote station in response to detection of the absence of a person at the local station, whereby, the remote station stops transmission of video signals over the data network to the local station in response to the STOP-TRANSMIT message.

7. A method of controlling transmission of video signals over a data network between a local station and a remote station, the method comprising, in combination:

detecting motion associated with the local station;

sending a START-TRANSMIT message over the data network to the remote station in response to detection of motion associated with the local station, whereby, the remote station starts transmission of video signals over the data network to the local station in response to the START-TRANSMIT message;

detecting an absence of motion associated with the local station; and sending a STOP-TRANSMIT message over the data network to the remote station in response to detection of the absence of motion associated with the local station, whereby, the remote station stops transmission of video signals over the data network to the local station in response to the STOP-TRANSMIT message.

8. The method as claimed in claim 7, further comprising, in combination:

the local station starting transmission of video signals over the data network to the remote station in response to detection of motion associated with the local station; and the local station stopping transmission of video signals over the data network to the remote station in response to detection of the absence of motion associated with the local station.

9. The method as claimed in claim 7, wherein detecting motion associated with the local station comprises, in combination:

capturing a video image associated with the local station;

comparing sequential frames of the video image; and determining that motion exists when the video image changes more than a predetermined threshold level from frame to frame.

10. The method as claimed in claim 7, wherein detecting an absence of motion associated with the local station comprises, in combination:

capturing a video image associated with the local station;

comparing sequential frames of the video image; and determining that motion does not exist when the video image does not change more than a predetermined threshold level from frame to frame.

11. A method of controlling transmission of video signals over a data network between a local station and a remote station, the method comprising, in combination:

applying a motion detector at the local station to detect motion at the local station;

the local station sending a START-TRANSMIT message to the remote station in response to detection of motion at the local station;

the remote station starting transmission of video signals over the data network to the local station in response to the START-TRANSMIT message;

the local station sending a STOP-TRANSMIT message to the remote station in response to detection of an absence of motion at the local station; and the remote station stopping transmission of video signals over the data network to the local station in response to the STOP-TRANSMIT message.

12. The method as claimed in claim 11, further comprising, in combination:

the local station starting transmission of video signals over the data network to the remote station in response to detection of motion at the local station; and the local station stopping transmission of video signals to the remote station in response to detection of an absence of motion at the local station.

13. The method as claimed in claim 11, wherein applying a motion detector at the local station to detect motion at the local station comprises, in combination:

capturing a video image associated with the local station;

comparing sequential frames of the video image; and determining that motion exists when the video image has changed more than a predetermined threshold level from frame to frame.

14. The method as claimed in claim 13, further comprising, in combination:

encoding the video image with motion vectors, wherein each of the motion vectors has an energy level; and determining that the video image has changed more than a predetermined threshold level from frame to frame when the energy level of the motion vectors exceeds a predetermined level.

15. A method for controlling transmission of video signals over a data network between a local station and a remote station, the local station communicating via a data link with a network access server, and the network access server communicating via the data network with the remote station, the local station having a video capture device for recording a local video image, the local station having a motion-state in which motion exists in the local video image and a still-state in which an absence of motion exists in the local video image, the method comprising, in combination:

the network access server receiving a MOTION signal when the local station changes from the still-state to the motion-state;

the network access server sending a START-TRANSMIT message over the network to the remote station in response to receipt of the MOTION signal;

the network access server receiving from the local station a STILL signal when the local station changes from the motion-state to the still-state; and the network access server sending a STOP-TRANSMIT message to the remote station in response to receipt of the STILL signal, whereby, in response to receipt of the START-TRANSMIT message, the remote station begins transmitting video signals over the data network to the network access server for transmission in turn to the local station, and whereby, in response to receipt of the STOP-TRANSMIT message, the remote station stops transmitting video signals over the data network to the network access server for transmission in turn to the local station.

16. The method as claimed in claim 15, further comprising, in combination:

the network access server registering the local station in memory as a video conference participant in response to receipt of the MOTION signal; and the network access server removing the local station from memory as a video conference participant in response to receipt of the STILL signal.

17. A method for controlling transmission of video signals over a data network between a plurality of local stations and a remote station, the plurality of local stations communicating with a network access server, the network access server being interconnected to the data network, each of the plurality of local stations respectively having a video capture device for capturing a video image associated with the local station, and each of the plurality of local stations having a motion-state in which motion exists in the video image associated with the local station and a still-state in which no motion exists in the video image associated with the local station, the method comprising, in combination:

each of the plurality of local stations providing a status signal to the network access server indicating whether the local station is in the motion-state or the still-state;

if all of the plurality of local stations are in the still-state, then, responsive to any of the plurality of local stations changing from the still-state to the motion-state, the network access server transmitting over the data network a START-TRANSMIT message;

upon receipt by the network access server of a video signal from the remote station, the network access server forwarding the video signal to each of the plurality of local stations, if any, that is in the motion-state; and responsive to a change in state of at least one of the plurality of local stations so that all of the plurality of local stations is then in the still-state, the network access server transmitting over the data network a STOP-TRANSMIT message.

18. A method of controlling transmission of video signals over a data network between a local station and a remote station, the method comprising, in combination:

applying a detector to determine whether a person is present at the local station;

sending a START-TRANSMIT message to the remote station in response to a determination that a person is present at the local station, whereby, the remote station starts transmission of video signals over the data network to the local station in response to the START-TRANSMIT message; and sending a STOP-TRANSMIT message to the remote station in response to a determination that no person is present at the local station, whereby, the remote station stops transmission of video signals over the data network to the local station in response to the STOP-TRANSMIT message.

19. The method as claimed in claim 18, further comprising, in combination:

the local station starting transmission of video signals over the data network to the remote station in response to the determination that a person is present at the local station; and the local station stopping transmission of video signals over the data network to the remote station in response to the determination that no person is present the local station.

20. An apparatus for controlling transmission of video signals over a data network between a local station and a remote station, the local station including a processor and a memory, the apparatus comprising, in combination:

a motion detector for detecting motion associated with the local station, the motion detector providing a detection signal having a MOTION state defining a presence of motion and an STILL state defining a absence of motion;

a first set of machine language instructions stored in the memory and executed by the processor, for (i) sending a START-TRANSMIT message over the data network to the remote station in response to a change of the detection signal from the STILL state to the MOTION state, and (ii) sending a STOP-TRANSMIT message over the data network to the remote station in response to a change of the detection signal from the MOTION state to the STILL state, whereby, the remote station starts transmission of video signals over the data network to the local station in response to the START-TRANSMIT message, and, whereby, the remote station stops transmission of video signals over the data network to the local station in response to the STOP-TRANSMIT message.

21. The apparatus as claimed in claim 20, wherein the motion detector receives a video image associated with the local station, and wherein the motion detector comprises a second set of machine language instructions stored in the memory and executed by the processor, for (i) comparing sequential frames of the video image and (ii) determining that motion exists when the video image changes by more than a predetermined amount from frame to frame.

22. The apparatus as claimed in claim 20, wherein the motion detector receives a video image associated with the local station, and wherein the motion detector comprises a second set of machine language instructions stored in the memory and executed by the processor, for (i) encoding the video image with motion vectors, the motion vectors defining an energy level, and (ii) determining that motion exists when the energy level exceeds a predetermined threshold.

23. The apparatus as claimed in claim 20, further comprising a video capture device at the local station.

24. The apparatus as claimed in claim 20, further comprising, in combination:

a video capture device capturing a video image associated with the local station;

a second set of machine language instructions stored in the memory and executed by the processor for (i) transmitting over the data network to the remote station a video signal representing the video image, in response to a change of the detection signal from the STILL state to the MOTION state, and (ii) stopping transmission over the data network to the remote station of the video signal representing the video image in response to a change of the detection signal from the MOTION state to the STILL state.

25. In a network access server providing connectivity between a computer network and a local station interconnected to the network access server via a data link, the network access server comprising, in combination, a line interface operatively connecting the network access server to the data link; a plurality of modems; a bus passing data signals between the line interface and the modems; and a network interface receiving data from the modems and routing the data onto the computer network and receiving data from the computer network and routing the data to the modems;

the improvement comprising:

said line interface receiving via the data link a motion-status signal indicating whether motion is present or absent at the local station; and a set of machine language instructions stored in a memory and executed by the network access server for (i) sending a START-TRANSMIT message into the network for receipt by a remote station, in response to the motion-status signal indicating that the local station has detected motion, and (ii) sending a STOP-TRANSMIT message into the network for receipt by the remote station, in response to the motion-status signal indicating that the local station has detected an absence of motion.

* * * * *